United States Patent [19]
Clifton et al.

[11] Patent Number: 5,471,105
[45] Date of Patent: Nov. 28, 1995

[54] NULL FLUX MAGNETIC BEARING WITH CROSS-CONNECTED LOOP PORTIONS

[75] Inventors: David B. Clifton, Leander; Scott R. Little; Joseph F. Pinkerton, both of Austin, all of Tex.

[73] Assignee: Magnetic Bearing Technologies, Inc., Austin, Tex.

[21] Appl. No.: 223,668

[22] Filed: Apr. 6, 1994

Related U.S. Application Data

[63] Continuation-in-part of Ser. No. 996,192, Dec. 23, 1992, Pat. No. 5,305,874, which is a continuation-in-part of Ser. No. 950,607, Sep. 25, 1992.

[51] Int. Cl.$^6$ .................................................. H02K 7/09
[52] U.S. Cl. .................................................. 310/90.5
[58] Field of Search .................... 310/90.5; 104/281, 104/283, 286

[56] References Cited

U.S. PATENT DOCUMENTS

| | | | |
|---|---|---|---|
| 3,771,033 | 11/1973 | Matsui et al. | 310/13 |
| 3,951,075 | 4/1976 | Miericke et al. | 104/281 |
| 3,952,668 | 4/1976 | Urankar | 104/281 |
| 4,363,525 | 12/1982 | Poubeau | 310/90.5 |
| 4,700,094 | 10/1987 | Downer et al. | 310/90.5 |
| 4,779,538 | 10/1988 | Fujiwara et al. | 104/282 |
| 4,785,212 | 11/1988 | Downer et al. | 310/90.5 |
| 4,874,998 | 10/1989 | Hollis, Jr. | 310/90.5 |
| 4,913,059 | 4/1990 | Fujie et al. | 104/282 |
| 5,302,874 | 4/1994 | Pinkerton | 310/90.5 |

FOREIGN PATENT DOCUMENTS 5065919 3/1993 Japan.

OTHER PUBLICATIONS

Richards et al., Magnetic suspension and propulsion systems for high-speed transportation, Jun. 1972, pp. 2680-2690.

Primary Examiner—Clayton E. LaBalle
Attorney, Agent, or Firm—Beveridge, DeGrandi, Weilacher & Young

[57] ABSTRACT

A magnetic bearing system has magnets for producing magnetic fields, and a member which carries loop portions of electrically conductive material. The member and magnets are relatively rotatable about an axis of rotation so that the loop portions travel along a prescribed circular path relative to and through the magnetic fields. The magnetic fields subject the loop portions to magnetic flux to produce electromotive forces in the loop portions when the loop portions deviate from the prescribed circular path. This induces an electrical current in the loop portions. The direction of this electrical current is such that, in the presence of the magnetic fields, Lorentz forces are exerted on the loop portions and the loop-carrying member in directions which are lateral with respect to the circular path. To avoid undesired current flow when the member is rotating on its prescribed axis, at least the first and second loop portions are electrically interconnected to form a closed loop. The interconnected loop portions are circumferentially spaced from each other and they lie in circumferentially spaced magnetic fields.

10 Claims, 1 Drawing Sheet

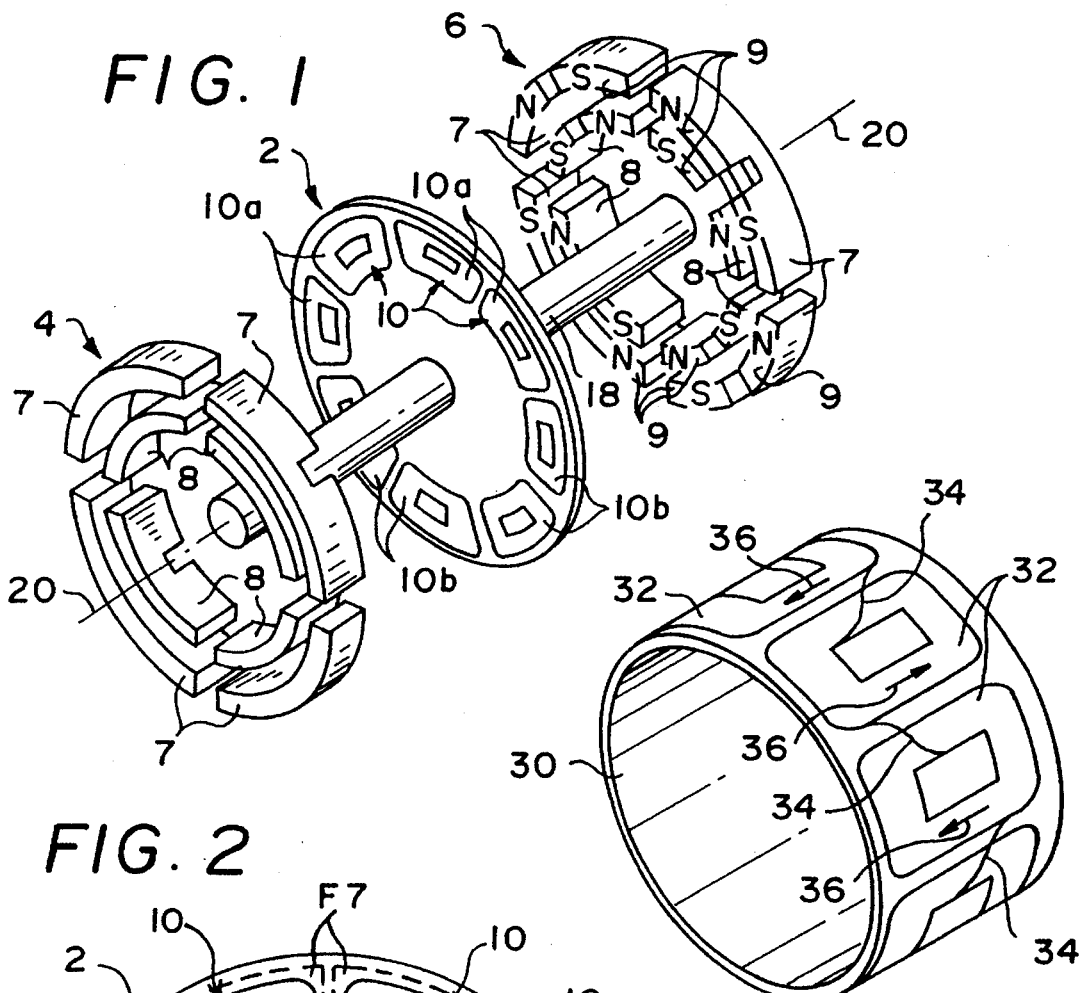
FIG. 1
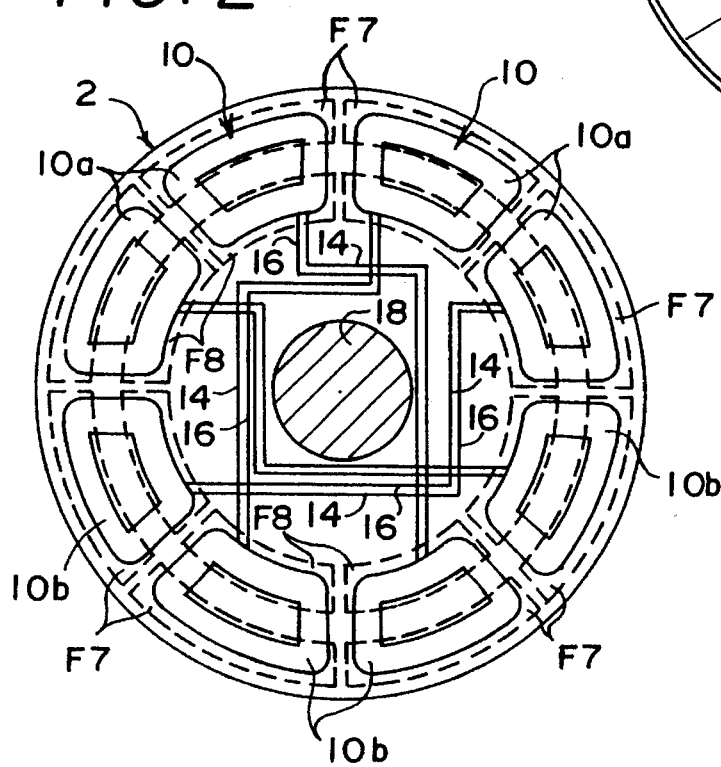
FIG. 2
FIG. 3
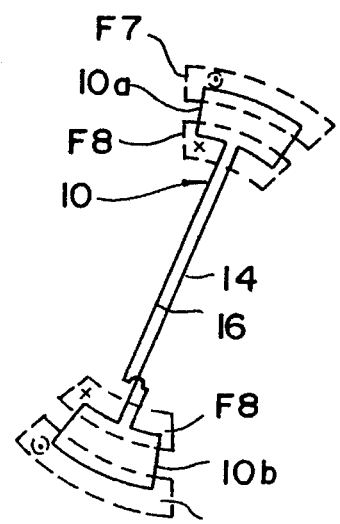
FIG. 4

5,471,105

1

NULL FLUX MAGNETIC BEARING WITH CROSS-CONNECTED LOOP PORTIONS

REFERENCE TO RELATED APPLICATIONS

This is a continuation-in-part of application Ser. No. 07/996,192 filed Dec. 23, 1992, (now U.S. Pat. No. 5,305,874) which, in turn, was a continuation-in-part of application Ser. No. 07/950,607 filed Sep. 25, 1992.

BACKGROUND OF THE INVENTION

This invention relates to rotary magnetic bearings of the null flux type in which there is relative rotation between (a) a member which carries a plurality of loops of electrically conductive material and (b) a plurality of field magnets which produce magnetic fields. Each loop is simultaneously exposed to two oppositely directed magnetic fields. When the loop is on its prescribed path, it is in a null flux (zero net magnetic flux) condition because it is exposed to equal quantities of the oppositely directed magnetic fluxes. However, when the loop deviates from the prescribed path, it is exposed to unequal quantities of the oppositely directed fluxes. There will be a finite net magnetic flux, thus resulting in the production of electromotive forces and an induced electric current in the loops. The direction of this current, in the presence of the magnetic fields, exerts Lorentz forces on the loops in directions which are lateral with respect to the circular path.

A detailed description of the principles of this type of bearing are provided in U.S. Pat. No. 5,305,874 which is incorporated herein by reference.

In bearings of this type, the loops of a radial bearing should all travel in a prescribed circular path which is concentric with a prescribed axis of rotation. In an axial bearing, the axial positioning of the loops should be uniform.

It is desirable to avoid any current flow in the loops when they are traveling in the prescribed path, but some obstacles have been experienced in achieving this condition. In manufacturing procedures, it is difficult to achieve perfect positioning, so loops are often offset from their designed positions. This results in a lack of uniformity so that all loops in a radial bearing are not equidistant from the axis of rotation, and all loops in an axial bearing are not at a uniform axial position. Due to this lack of uniformity, some current will flow in some loops at all times, even when the rotor is at its prescribed position.

In a radial bearing, centrifugal forces can also result in undesired loop currents. In such bearings, the loops are carried by a disc. When the disc rotates at very high angular velocities, centrifugal force will cause radial expansion of the disc. For example, a 4 inch diameter, 0.1 inch thick disc of fiberglass rotating at 60,000 RPM will expand radially almost 0.02 inch. Thus, even though the rotor axis is at its prescribed position, some current will flow through the loop. Under this condition, the loop will generate heat, the bearing will lose some of its stiffness, and the shaft will be subjected to a steady drag to detract from bearing performance.

Another source of undesired loop current and potential overheating in a radial bearing is attributable to the geometry of the loops and the magnetic fields. The radial legs of a loop do not evenly enter and exit the magnetic fields. The boundaries of a magnetic field have their radial borders at one angle, while the radial legs of a loop can have a range of angular borders which vary from the leading edge to the

2 trailing edge of each radial leg. Due to this geometrical situation, a voltage may be prematurely induced in a radial loop, and the resulting current can continue for a significant period. Unwanted heating due to these currents is thus generated.

The present invention provides a solution to the foregoing problems, and it will minimize the occurrence of undesired currents in the loops of a rotor which is rotating at its prescribed axial and radial position.

SUMMARY OF THE INVENTION

This invention is directed to a magnetic bearing system of the type in which a member and field magnets are relatively rotatable about an axis of rotation. The member has a plurality of loop portions of electrically conductive material fixed thereon, and these loop portions travel along a prescribed circular path relative to and through magnetic fields emanating from the field magnets. The field magnets are located where their magnetic fields subject the loop portions to magnetic flux to produce electromotive forces and to induce electrical currents in the loop portions when they deviate from the prescribed circular path. The electrical current has a direction which, in the presence of the magnetic fields, exerts Lorentz forces on the loop portions and member in directions which are lateral with respect to the circular path. A principal feature of this invention is that at least first and second loop portions are electrically interconnected to form a closed loop. These first and second loop portions are circumferentially spaced from each other and they lie in circumferentially spaced magnetic fields.

Preferably, the loop-carrying member is a rotor, and the field magnets are stationary permanent magnets.

In one embodiment, the magnetic bearing system is a radial magnetic bearing system and the loop portions lie in a radial plane; the first and second loop portions are diametrically opposed on the member; each of the field magnets has circumferentially spaced poles of opposite polarity; and, the field magnets have poles which are positioned and arranged so that a loop is simultaneously exposed to two radially spaced magnetic fields which are oppositely directed.

In an axial magnetic bearing, the member includes a cylindrical body on which the loop portions are mounted; and, all of the loop portions can be connected together electrically.

BRIEF DESCRIPTION OF THE DRAWINGS

FIG. 1 is a schematic perspective view showing a null-flux radial magnetic bearing constructed according to the invention.

FIG. 2 is a front view of a disc used in the bearing of FIG. 1.

FIG. 3 is a perspective view of the cylinder of an axial magnetic bearing constructed according to the invention.

FIG. 4 is a diagram showing the wiring connections between two loop portions to form a closed loop in the bearing of FIGS. 1 and 2.

DETAILED DESCRIPTION

Referring to FIGS. 1 and 2, it will be seen that a magnetic bearing according to the invention includes a rotating disc member 2 positioned between two opposed stationary sets of permanent magnets 4 and 6. In each set of magnets, there is an outside ring of four magnets 7 and an inside ring of four magnets 8. Each magnet 7, 8 has two poles 9 which are circumferentially spaced, and they face axially toward the disc 2. The boundaries of the magnetic fields produced by these magnets are shown in broken lines in FIG. 2 where the fields produced by magnets 7 are shown at F7 and those produced by magnets 8 are identified by the reference character F8.

The disc 2 is made of a nonmagnetic material which is not electrically conductive, and it carries a plurality of loops 10 of electrically conductive material. The disc may be made of carbon composite material with a thickened perimeter. As shown in FIG. 2, each loop has diametrically opposed portions 10a and 10b which are each formed as a coil or loop. The loop portions are coils potted in epoxy and overlaid with 10 mil sheets of fiberglass. The loop portions 10a and 10b are circumferentially spaced from each other, and they lie in circumferentially spaced magnetic fields. As shown in FIG. 4, pairs of loop portions are electrically interconnected by conductors 14 and 16 to form a closed loop 10. Four such loops are shown in FIG. 2. In discs which have a diameter greater than 4 inches, a capacitor can be wired in series with each closed loop 10.

A shaft 18 is connected to the disc 2. When this shaft is rotated by a motor (not shown), the loop portions 10a and 10b will travel in a circular path which is concentric with respect to a prescribed axis of rotation 20. When the actual axis of rotation coincides with the prescribed axis of rotation 20, the loop portions 10a and 10b will all be travelling in their prescribed circular paths.

The field magnets 7 and 8 are located so that their magnetic fields F7 and F8 will subject the loop portions 10a and 10b to magnetic flux. When the loop portions are traveling in their prescribed paths, each loop portion is subjected equally to the flux of outboard and inboard fields F7 and F8. However, when the paths of two interconnected loop portions deviate from the prescribed path, they will be subjected to unequal amounts of flux from the outboard and inboard fields F7 and F8. This produces electromotive forces in the loop so that an electrical current will be induced in it. The direction of these electrical currents, in the presence of the magnetic fields F7 and F8 of the magnets, is such that Lorentz forces are exerted on the loop and the disc member 2. These Lorentz forces are laterally oriented with respect to the circular path, and they are directed toward the prescribed path. In a radial bearing, this lateral direction is radially oriented with respect to the axis of rotation. In an axial bearing, the lateral forces are directed axially. In each case, the Lorentz forces tend to move the loop portions 10a and 10b toward their prescribed path, i.e. to a null-flux position where each loop portion 10a and 10b is exposed substantially equally to the two fields F7 and F8.

At high angular velocities, centrifugal force will cause the rotor to expand in the radial direction so that each loop portion will move radially out from the axis of rotation. Since diametrically opposed loop portions 10a and 10b are electrically connected to each other, and since each of these loop portions moves outwardly by an equal distance, both are exposed to the same amount of net flux from the magnetic fields through which they travel. By virtue of their cross-connection, the voltages thereby induced oppose each other so that no current will flow through the interconnected pair of loop portions as long as the rotational axis coincides with the prescribed axis of rotation 20.

FIG. 3 shows a rotor portion of an axial bearing constructed according to the invention. This bearing has a cylindrical body 30 on which the loop portions 32 are mounted. All of these loop portions 32 are connected together electrically by conductors 34 to form a single closed loop on the rotor. The connections are made in a manner so that, as indicated by the arrows 36, current will flow in opposite directions in circumferentially adjacent loop portions. These loop portions travel through two axially spaced sets of circumferentially spaced magnetic fields in which axially adjacent fields are oppositely directed, as are circumferentially adjacent fields. This chain of loop portions will collectively find a null flux axial position which determines the axial aspect of the rotor's prescribed path. When there is any axial deviation from the prescribed path, the laterally directed Lorentz forces will be axially oriented with respect to the axis of rotation.

Persons familiar with the field of the invention will realize that the invention may take many forms other than the relatively rudimentary embodiments disclosed herein. Preferably, the bearing assembly will include both radial and axial bearings. In some instances, the disc may be on the stator and the magnets on the rotor. Electromagnets may be used in lieu of permanent magnets. The bearings may be of a semi-active type, in which the magnets are augmented by electromagnets or other controllable magnets which provide variable magnetic fields which permit stiffness or positional adjustments.

In view of the foregoing, it will be understood that the invention is not limited solely to the disclosed embodiment, but embraces modifications, variations, and improvements thereto which fall within the scope of the following claims.

We claim:

1. A magnetic bearing system, comprising, a member having a plurality of loop portions of electrically conductive material fixed thereon, a plurality of field magnets for producing a plurality of magnetic fields, said member and said field magnets being relatively rotatable about an axis of rotation so that said loop portions travel along a prescribed circular path relative to and through said magnetic fields, said field magnets being at locations where their magnetic fields subject said loop portions to magnetic flux to produce electromotive forces in said loop portions so that an electrical current is induced in said loop portions when they deviate from the prescribed circular path; said electrical current having a direction which, in the presence of said magnetic fields, exerts Lorentz forces on said loop portions and said member in directions which are lateral with respect to said circular path, at least first and second said loop portions being electrically interconnected to form a closed loop, said first and second loop portions being circumferentially spaced from each other and lying in circumferentially spaced magnetic fields.

2. A magnetic bearing system according to claim 1 wherein the first and second loop portions are diametrically opposed on said member.

3. A magnetic bearing system according to claim 1 wherein said member is a rotor and said field magnets are stationary.

4. A magnetic bearing system according to claim 1 wherein said loop portions lie in a radial plane and said magnetic bearing system is a radial magnetic bearing system.

5. A magnetic bearing system according to claim 1 wherein said field magnets are permanent magnets.

6. A magnetic bearing system according to claim 1 wherein each of said field magnets has circumferentially spaced poles of opposite polarity.

7. A magnetic bearing system according to claim 1 wherein said field magnets have poles which are positioned and arranged so that each loop portion is simultaneously exposed to two radially spaced magnetic fields which are oppositely directed.

8. A magnetic bearing system according to claim 1 wherein the bearing system is an axial bearing system, and the member is a cylindrical body on which said loop portions are mounted.

9. A magnetic bearing system according to claim 8 wherein all of said loop portions are connected together electrically to form a single loop.

10. A magnetic bearing system according to claim 9 in which said loop portions are connected so that current in circumferentially adjacent loop portions flows in opposite directions when said loop portions deviate from the prescribed circular path.

* * * * *